US005681489A

United States Patent [19]

Carkhuff

[11] Patent Number: 5,681,489

[45] Date of Patent: Oct. 28, 1997

[54] PLASMA ARC TORCH INCLUDING MEANS FOR DISABLING POWER SOURCE

[75] Inventor: Donald W. Carkhuff, Florence, S.C.

[73] Assignee: The ESAB Group, Inc., Florence, S.C.

[21] Appl. No.: 571,709

[22] Filed: Dec. 13, 1995

[51] Int. Cl.[6] .................................................... B23K 10/00

[52] U.S. Cl. ................................ 219/121.48; 219/121.55; 219/121.54; 219/121.51

[58] Field of Search ......................... 219/121.48, 121.51, 219/121.5, 121.52, 75, 121.54, 121.55, 121.57

[56] References Cited

U.S. PATENT DOCUMENTS

| | | | |
|---|---|---|---|
| 3,731,047 | 5/1973 | Mullen et al. . | |
| 4,133,988 | 1/1979 | Esibyan et al. | 219/121.36 |
| 4,580,032 | 4/1986 | Carkhuff . | |
| 4,663,515 | 5/1987 | Kneeland et al. | 219/121 PT |
| 4,701,590 | 10/1987 | Hatch . | |
| 4,775,774 | 10/1988 | Caneer, Jr. | 219/121.55 |
| 4,781,175 | 11/1988 | McGreevy et al. | 219/121.51 |
| 4,929,811 | 5/1990 | Blankenship . | |
| 4,973,816 | 11/1990 | Haberman . | |
| 5,039,837 | 8/1991 | Nourbakhsh et al. . | |
| 5,216,221 | 6/1993 | Carkhuff | 219/121.51 |

*Primary Examiner*—Mark H. Paschall

*Attorney, Agent, or Firm*—Bell, Seltzer, Park & Gibson, P.A.

[57] ABSTRACT

A plasma arc torch includes a torch body defining a discharge axis, an electrode coaxially aligned on the discharge axis, a nozzle assembly positioned adjacent the discharge end of the electrode, and a heat shield removably secured on the torch body. A power supply delivers electrical current to the electrode to create an electrical arc, and a plasma gas is delivered so as to surround the arc. Also, a pressure sensing system is provided for sensing the pressure of the plasma gas and for disabling the power supply if there is insufficient gas pressure, such as when the heat shield is removed.

13 Claims, 3 Drawing Sheets

PLASMA ARC TORCH INCLUDING MEANS FOR DISABLING POWER SOURCE

FIELD OF THE INVENTION

The invention relates to a plasma arc torch, and more particularly to a plasma arc torch including means for disabling the power source if there is insufficient gas pressure to provide the required cooling and plasma gas flow through the torch.

BACKGROUND OF THE INVENTION

In a plasma arc torch, a high voltage is generated at an electrode to create an electrical arc extending from the electrode and through the bore of a nozzle assembly. A pressurized flow of gas is supplied between the electrode and the bore to form a plasma arc extending through the bore to a workpiece positioned beneath the torch. Over time, the electrode and the nozzle erode and thereafter do not produce satisfactory cuts. As a result, the electrode and the nozzle assembly must be replaced periodically.

Typically, the electrode is mounted to the torch body and an outer heat shield is threaded on the torch body over the nozzle assembly. Thus, the operator must remove the heat shield to replace the electrode or the nozzle assembly. With the heat shield removed, it is still possible to create an electrical arc between the electrode and the workpiece (or any object having a lower potential than the electrode) if an electrical current is supplied to the electrode.

A plasma arc torch which includes a mechanism for disabling the power source is disclosed in U.S. Pat. No. 5,216,221 issued Jun. 1, 1993 to Carkhuff and assigned to the present assignee. The torch includes an outer heat shield removably secured on the torch body over the nozzle assembly. The heat shield includes an electrically conductive member on its inner surface that completes an electrical interlock circuit when the nozzle assembly and the heat shield are secured on the torch body. When the heat shield or the nozzle assembly is removed, the electrical continuity circuit is opened and the power source is disabled. The torch disclosed in U.S. Pat. No. 5,216,221 includes a pair of contact members, a pair of insulating members, an electrically conductive insert on the outer heat shield and a retaining nut configured together to complete the electrical circuit. The number and the arrangement of the parts increases the complexity of the torch.

U.S. Pat. No. 4,929,811 issued May 29, 1990 to Blankenship discloses a plasma arc torch including a fault detection circuit. A continuity interlock circuit indicates a loss of electrical contact when the outer heat shield or the nozzle assembly is not in the proper operating position. The fault detection circuit prevents the supply of electrical current to the electrode in response to an "open" indication from the continuity interlock circuit. The disabling mechanism disclosed in the patent to Blankenship, however, is also complex.

U.S. Pat. No. 4,701,590 to Hatch and U.S. Pat. No. 4,580,032 to Carkhuff and assigned to the present assignee each disclose a plasma arc torch including spring-loaded means for disabling the electrode. In the patent to Hatch, the electrode is expelled from the torch body when the outer heat shield or the nozzle assembly is removed. In the patent to Carkhuff, a spring urges a nonconductive ball against a valve seat to prevent the flow of gas through the torch when the outer heat shield is removed. The supply of electrical current to the electrode is then prevented by an electrical circuit responsive to the flow of gas.

Although the disabling mechanisms disclosed in the Hatch and Carkhuff patents are effective, moving parts are not preferred in a plasma arc torch. The moving parts add to the expense of assembling the torch and increase its complexity. The complexity of the torch further increases the likelihood that the torch will require additional maintenance during its service life.

It is accordingly an object of the present invention to provide a plasma arc torch including a relatively noncomplex and reliable mechanism for disabling the power source if there is insufficient gas pressure to provide the required cooling and plasma gas flow through the torch.

It is another object of the invention to provide a mechanism for disabling the flow of electrical current to the torch that does not use moving parts.

It is another, and more particular, objective of the invention to provide a mechanism for disabling the flow of electrical current to a plasma arc torch when the heat shield is removed and the electrode and other current carrying members of the torch are exposed.

SUMMARY OF THE INVENTION

The above and other objects and advantages of the present invention are achieved by the provision of a plasma arc torch which includes a torch body defining a discharge axis, an electrode mounted on the torch body along the discharge axis, a nozzle assembly positioned adjacent the discharge end of the electrode, and an outer heat shield assembly secured on the torch body. The torch also includes a power supply connected to the electrode so as to create an electrical arc extending from the electrode, and means for supplying a pressurized flow of gas about the electrical arc to thereby create a plasma flow. Also, a pressure sensing means is provided for sensing the gas pressure in the torch body and for disabling the flow of electrical current if the gas pressure falls below a predetermined level.

In a preferred embodiment, the torch body includes a head portion defining the discharge axis and a handle portion extending outwardly from the head portion. The head portion includes a housing and an electrode holder disposed within the housing and extending along the discharge axis. The electrode holder defines a cavity coaxially aligned with the discharge axis for receiving the electrode.

The handle portion of the torch body permits an operator to hold the torch to accomplish a cutting operation on a workpiece positioned beneath the torch. The handle portion includes a housing defining a cavity therein accommodating the conduit for supplying the pressurized flow of gas to the torch body and the electrical current to the electrode. The cavity further accommodates the means for sensing the gas pressure and for disabling the flow of electrical current to the torch. A control switch is provided on the handle to activate the torch.

The electrode is mounted to the electrode holder such that the electrode may be readily removed for replacement. For example, the electrode may be held against the electrode holder by the nozzle assembly when the heat shield is secured on the torch body. Preferably, however, the electrode is externally threaded opposite its discharge end and engages internal threads provided on the electrode holder adjacent the cavity defined by the electrode holder. Thus, the electrode is readily removable and is in good electrical contact with the electrode holder.

The nozzle assembly is positioned adjacent the electrode and includes a cup-shaped nozzle defining a cavity for receiving the discharge end of the electrode. The nozzle has a bore therethrough coaxially aligned with the discharge axis. The nozzle assembly may also include a swirl ring positioned between a flat on the underside of the electrode and the nozzle.

The outer heat shield assembly includes a large, cup-shaped heat shield defining a cavity for receiving the nozzle assembly and the discharge end of the electrode. The heat shield is preferably internally threaded and engages external threads on the head portion such that the heat shield is removably secured on the torch body. A resilient O-ring is positioned between the head portion and the heat shield to protect the nozzle assembly and the electrode from external contaminants and to seal the gas pressure in the torch body when the heat shield is properly secured on the torch body.

The conduit positioned within the handle portion of the torch body defines a gas passageway for the pressurized flow of gas. The conduit originates at the source of the pressurized gas and terminates in the head portion of the torch body at the electrode holder. Thus, the source of pressurized gas is in fluid communication with the cavity defined by the electrode holder. A power supply cable is centrally positioned within the conduit and extends between a source of electrical current and the electrode in the handle portion of the torch body.

The detecting means includes a conduit positioned within the handle portion of the torch body and defining a gas passageway. The conduit originates in the head portion of the torch body at the electrode holder and terminates at a pressure switch. Thus, the cavity defined by the electrode holder is in fluid communication with the pressure switch. The pressure switch is electrically connected to the power source and is movable between an open position and a closed position in response to the gas pressure in the torch body.

In operation, the electrode and the nozzle assembly are positioned on the torch body and the heat shield is secured on the torch body. To activate the torch and begin cutting, the operator depresses the control switch on the handle portion of the torch body. When the control switch is depressed, a low voltage circuit in the power source is closed. The circuit opens a solenoid valve so that the pressurized gas flows to the torch. The detecting means senses the gas pressure in the torch body. If the gas pressure is sufficient to provide the required cooling and plasma gas flow through the torch, the detecting means closes an electrical circuit that permits the power source to supply electrical current to the torch.

In an alternative embodiment, the detecting means is positioned in the conduit that supplies the pressurized gas and electrical current to the torch. The detecting means of the alternative embodiment includes a venturi chamber and a conduit defining a gas passageway. The venturi chamber includes a throat having an opening extending radially outwardly therefrom and into the gas passageway of the detecting means.

In operation, the pressurized gas flows through the gas passageway in the conduit to the torch body as previously described. If there is sufficient gas pressure in the torch body, a back pressure of pressurized gas will flow through the opening in the throat of the venturi chamber and into the gas passageway of the detecting means. Accordingly, the pressure switch will be closed and the power source will supply an electrical current to the electrode.

If there is insufficient gas pressure in the torch body, such as when the heat shield is removed, the pressurized gas flows freely to the ambient atmosphere. As a result, the venturi chamber creates a vacuum at the opening in the throat that suctions any gas in the gas passageway of the detecting means into the gas passageway of the conduit. Accordingly, the pressure switch will be open and the power source will not supply an electrical current to the electrode.

In another alternative embodiment, the detecting means is positioned within the handle portion adjacent the conduit such that the gas passageway of the detecting means is in fluid communication with the conduit. If there is sufficient gas pressure in the torch body, the pressure switch will be closed and the power source will supply an electrical current to the electrode. If there is insufficient gas pressure in the torch, such as when the heat shield is removed, the pressure switch will be open and the power source will not supply electrical current to the electrode.

In another alternative embodiment, the torch includes circuit means for providing a pilot arc between the electrode and the nozzle, and before transferring the plasma arc to the workpiece. The gas passageway of the sensing means is electrically conductive and is in electrical contact with a conducting body secured to the inner surface of the housing of the torch body. An insulating body positioned between the electrode holder and the conducting body has a slot therein defining a gas passageway such that the gas passageway of the detecting means is in fluid communication with the cavity defined by the heat shield. If there is insufficient gas pressure in the torch body, such as when the heat shield is removed, the pressure switch will be open and the power source will not supply electrical current to the electrode.

A particular feature of the invention is that the power source will not supply electrical current to the electrode when the heat shield is removed even if the head portion of the torch body is inadvertently held firmly against the workpiece or a flat surface. When the operator depresses the control switch and the pressurized flow of gas is supplied to the torch body as previously described, if the head portion is held firmly against the workpiece a back pressure of pressurized gas will not flow to the pressure switch of the detecting means. Instead, the pressurized gas will flow out a radially extending opening in the housing to the ambient atmosphere. Thus, the pressure switch will be open and the power source will be disabled.

BRIEF DESCRIPTION OF THE DRAWINGS

Having set forth some of the objects and advantages of the invention, other objects and advantages will appear as the description of the invention proceeds when considered in conjunction with the following drawings in which:

FIG. 10 is an elevation view illustrating the operation of a plasma arc torch according to the invention with the heat shield removed and the torch body held firmly against a workpiece.

DETAILED DESCRIPTION OF THE PREFERRED EMBODIMENTS

Figure 1:
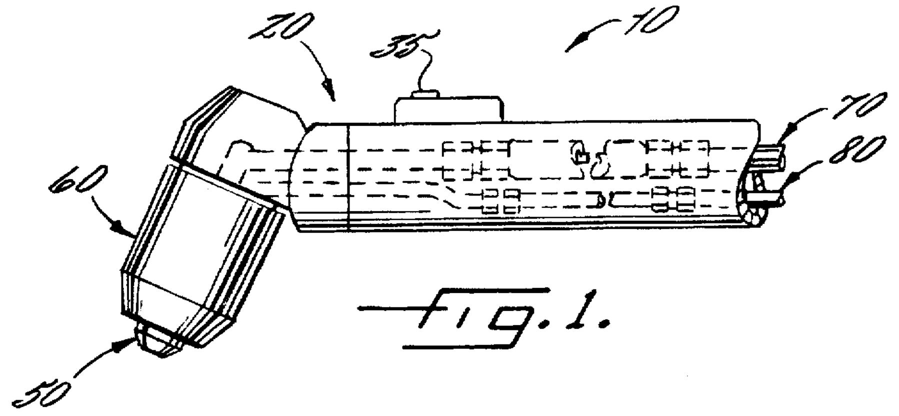
FIG. 1 is an elevation view of a plasma arc torch according to the invention.
Figure 2:
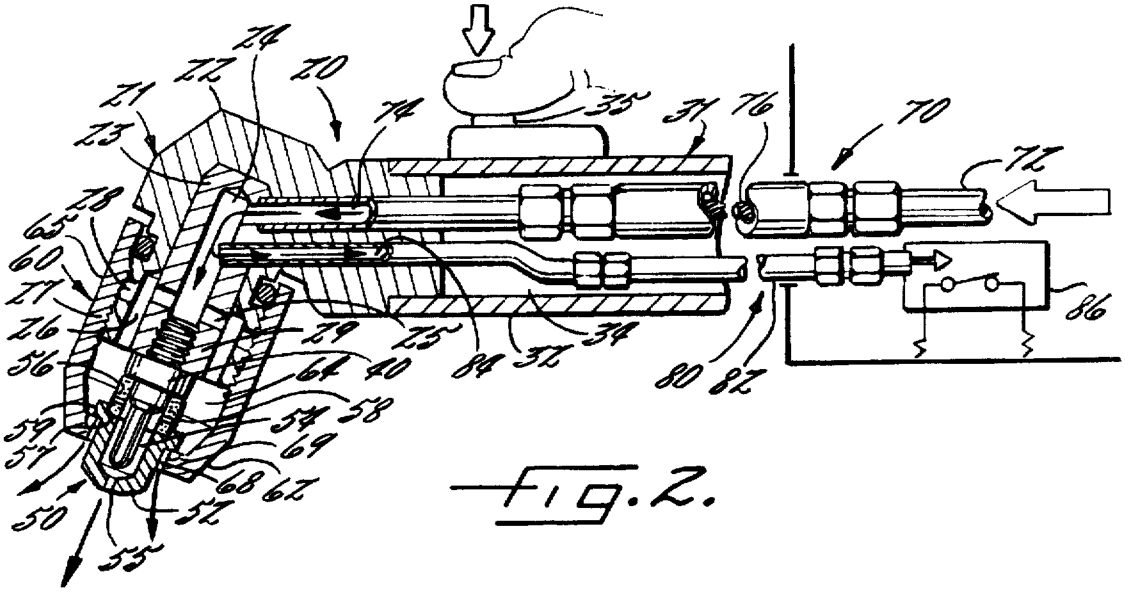
FIG. 2 is a sectional view of the plasma arc torch of FIG. 1 with the heat shield secured on the torch body.
Figure 3:
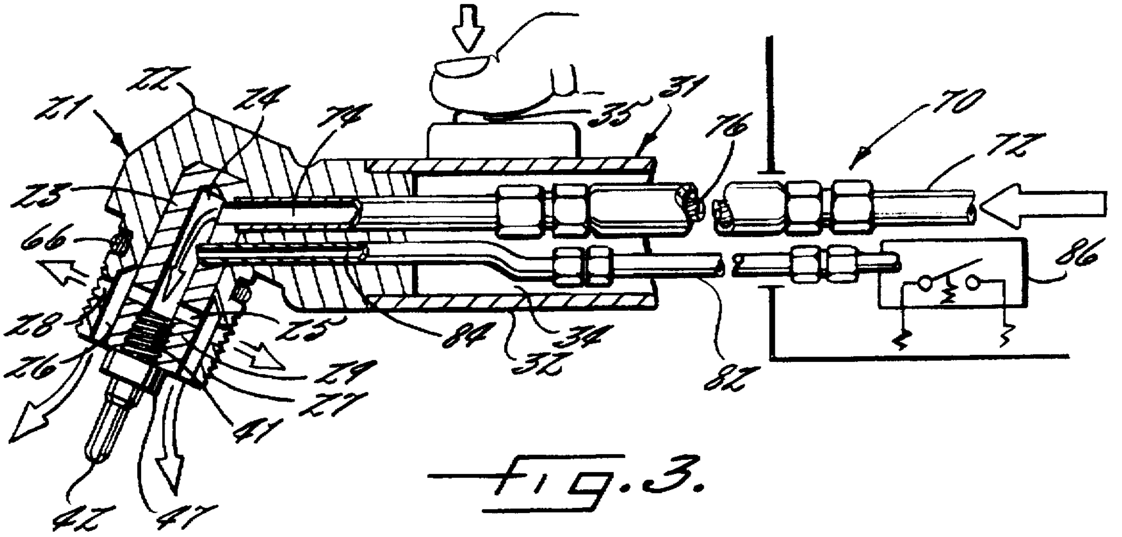
FIG. 3 is a sectional view of the plasma arc torch of FIG. 1 with the heat shield removed.

Referring to the accompanying drawings, FIGS. 1–3 illustrate a preferred embodiment of a plasma arc torch, indicated generally at 10, according to the invention. The torch 10 comprises a torch body 20, an electrode 40 mounted within the torch body, a nozzle assembly 50 positioned adjacent the electrode and an outer heat shield assembly 60 secured on the torch body. The torch 10 further comprises gas supplying means 70 for supplying a pressurized flow of gas through the torch body 20 and electrical power to the electrode 40, and detecting means 80 for sensing the gas pressure in the torch body and for disabling the flow of electrical current to the electrode in accordance with the present invention.

As best shown in FIGS. 2 and 3, the torch body 20 comprises a generally cylindrical head portion 21 defining a discharge axis and a handle portion 31 extending outwardly from the head portion. Torch body 20 is typically made of a hard, heat-resistant material such as thermoset plastic or epoxy compound which protects the components of the torch from the high heat generated during plasma arc cutting.

Head portion 21 comprises a housing 22 and an electrode holder 23 disposed within the housing and extending along the discharge axis. Electrode holder 23 defines an internal bore 24 therein which is coaxially aligned with the discharge axis. Electrode holder 23 is made of an electrically conductive material, preferably copper or copper alloy, such that the holder conducts an electrical current to electrode 40. Electrode holder 23 has at least one radially extending hole 25 therethrough such that the bore 24 is in fluid communication with a gas passageway 26 defined by the inner surface of the lower portion 27 of housing 22 and the outer surface of the lower portion 29 of electrode holder 23. Housing 22 likewise has at least one radially extending opening 28 therethrough such that passageway 26 is in fluid communication with the ambient atmosphere when outer heat shield assembly 60 is removed as shown in FIG. 3.

Handle portion 31 permits an operator to grasp the torch 10 to perform a cutting operation. Handle portion 31 is generally cylindrical and comprises a hollow housing 32 defining a cavity 34 therein for accommodating the gas supplying means 70 and the detecting means 80. Handle portion 31 further comprises a control switch 35 for activating the torch 10, in the manner further described below.

Electrode 40 is coaxially aligned with the discharge axis adjacent the lower portion 29 of electrode holder 23. Electrode 40 may be mounted to electrode holder 23 in any manner that permits the electrode to be readily removed for replacement. For example, electrode 40 may be press fit into electrode holder 23 or may be held against the lower transverse surface of the electrode holder by nozzle assembly 50 when heat shield assembly 60 is secured on torch body 20. Preferably, however, electrode 40 comprises an externally threaded portion 41 opposite the discharge end 42 thereof, and as shown most clearly in FIG. 3. Threaded portion 41 engages internal threads provided on the lower portion 29 of electrode holder 23 to removably secure the electrode 40 on the torch body 20 and to thereby ensure that the electrode is in good electrical contact with the electrode holder.

The discharge end 42 of electrode 40 may comprise an emissive insert (not shown) which acts as the cathode terminal for an electrical arc extending from the discharge end of the electrode in the direction of the nozzle assembly 50. An electrode comprising an emissive insert is disclosed in U.S. Pat. No. 5,023,425 to Severance, Jr., and assigned to the assignee of the present invention. The emissive insert is composed of a material which has a relatively low work function, defined in the art as the potential step, measured in electron volts, that permits thermionic emission from the surface of a metal at a given temperature. In view of its low work function, the insert readily emits electrons in the presence of an electrical potential. Commonly used insert materials include hafnium, zirconium, tungsten, and alloys thereof.

Nozzle assembly 50 is positioned adjacent electrode 40 and comprises a cup-shaped nozzle 52 defining a cavity 54 between the outer surface of the electrode and the inner surface of the nozzle. Nozzle 52 has a bore 55 therethrough opposite the discharge end 42 of the electrode 40 and coaxially aligned with the discharge axis. Nozzle assembly 50 preferably further comprises a swirl ring 56 positioned between a transverse annular flat 47 (FIG. 3) provided on electrode 40 and a transverse annular flat 57 (FIG. 2) provided on nozzle 52. Swirl ring 56 is preferably made of an electrical and thermal insulating material, such as ceramic, and has at least one radially extending hole 58 therethrough such that cavity 54 is in fluid communication with gas passageway 26.

Outer heat shield assembly 60 comprises a large, cup-shaped heat shield 62 defining a cavity 64 therein. The inner surface of the upper portion 65 of heat shield 62 and the outer surface of the lower portion 27 of housing 22 are threaded such that the heat shield is removably secured on torch body 20. A resilient O-ring 66 (FIG. 3) is positioned between housing 22 and heat shield 62 to protect electrode 40 and nozzle assembly 50 from external contaminants and to seal the torch body 20 when the heat shield is properly secured on the torch body. Heat shield 62 has an opening 68 therethrough adjacent nozzle 52 and coaxially aligned with the discharge axis. Heat shield 62 engages a shoulder 59 provided on nozzle 52 to hold nozzle assembly 50 against flat 47 on electrode 40 when the heat shield is secured on torch body 20. Heat shield 62 further has at least one slot 69 in the periphery of the opening 68 and adjacent the shoulder 59 of the nozzle 52, such that the cavity 64 is in fluid communication with the ambient atmosphere via the opening 68.

Gas supplying means 70 comprises a hollow conduit 72 defining a gas passageway 74 and positioned within handle portion 31 of torch body 20. Conduit 72 originates at the source of pressurized gas (not shown) and terminates in head portion 21 of torch body 20 at electrode holder 23 such that the source of pressurized gas is in fluid communication with the internal bore 24. Gas supplying means 70 further comprises a power supply cable 76 centrally positioned within and electrically connected to the conduit 72 and the power source (not shown), such that the power source is electrically connected to the electrode 40.

Detecting means 80 comprises a hollow conduit 82 defining a gas passageway 84 and positioned within handle portion 31 of torch body 20. Conduit 82 originates in head portion 21 of torch body 20 at electrode holder 23 and terminates at a pressure switch 86 such that the pressure switch is in fluid communication with the bore 24. Pressure switch 86 is movable between an open position and a closed position in response to the gas pressure in passageway 84 for a purpose to be described hereafter.

In operation, outer heat shield assembly 60 is secured on torch body 20 as illustrated in FIG. 2. When the operator depresses the control switch 35, a low voltage electrical circuit in the power source is closed. The electrical circuit opens a solenoid positioned in the power source such that means 70 supplies a pressurized flow of gas through passageway 74 in conduit 72 to the bore 24 in head portion 21.

As indicated by the arrows, the pressurized gas flows out of the bore 24 through hole 25 in electrode holder 23 and into gas passageway 26. From passageway 26, the pressurized gas flows into cavity 64 in heat shield 62. A portion of the pressurized gas is forced through the hole 58 in the swirl ring 56 such that the gas swirls around electrode 40 in cavity 54 and exits through bore 55 of nozzle 52 in the direction of a workpiece (not shown). The balance of the pressurized gas flows out of cavity 64 through the slot 69 and opening 68 to the ambient atmosphere.

The pressurized gas may be any gas capable of forming a plasma flow, but preferably is air, oxygen, or argon mixed with nitrogen. At its source, the pressure of the gas is typically about 65 psi. When heat shield assembly 60 is secured on torch body 20, detecting means 80 senses the gas pressure in the torch body. With the heat shield assembly 60 secured to the torch body 20, the pressure of the gas inside the torch body is typically about 25 psi. If means 80 senses sufficient gas pressure in the torch body 20 to provide cooling and the required gas flow for a predetermined time, typically about five seconds, the detecting means closes, or causes to be closed, an electrical circuit to permit the power source to supply electrical current to the torch 10.

As long as there is there is sufficient gas pressure in torch body 20, and in particular, as long as heat shield 62 is secured on housing 22, a back pressure of pressurized gas will be sensed at pressure switch 86 via conduit 82. Thus, pressure switch 86 will be closed as shown in FIG. 2 and an electrical control circuit will be established between the pressure switch 86 and the power source. Accordingly, the power source will supply electrical current to electrode 40.

If, however, there is insufficient gas pressure in the torch body 20, such as when the heat shield 62 is removed, the pressurized gas will flow through the torch body in the manner illustrated in FIG. 3. The pressurized gas exiting the bore 24 through hole 25 will flow into gas passageway 26 as described previously. From passageway 26, however, the pressurized gas will flow out opening 28 to the ambient atmosphere. As a result, a back pressure of pressurized gas will not be sensed at pressure switch 86 via conduit 82. Thus, pressure switch 86 will be open and the power source will not supply an electrical current to the electrode 40.

Figure 4:
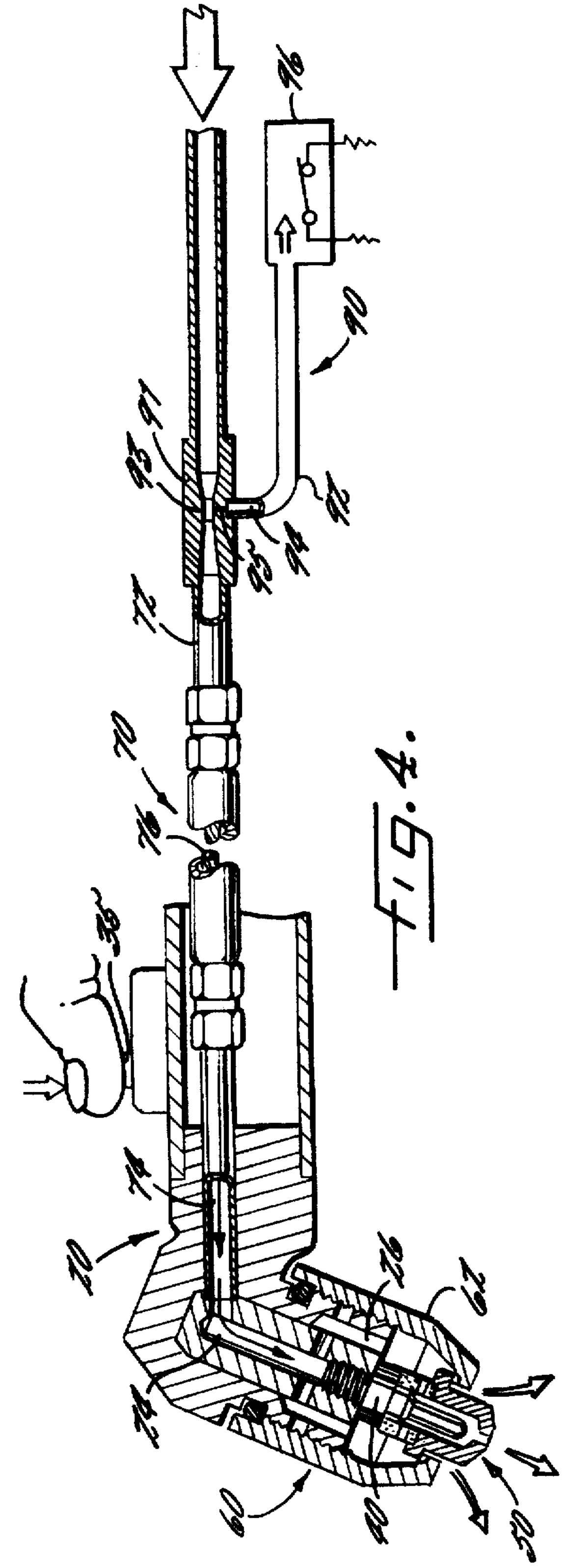
FIG. 4 is a sectional view of an alternative embodiment of a plasma arc torch according to the invention with the heat shield secured on the torch body.
Figure 6:
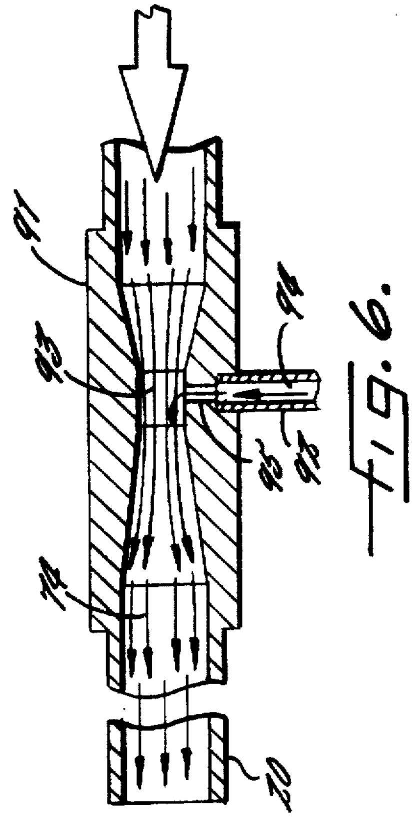
FIG. 6 is a sectional view of the venturi chamber of the plasma arc torch of FIG. 4 when the heat shield is removed.
Figure 5:
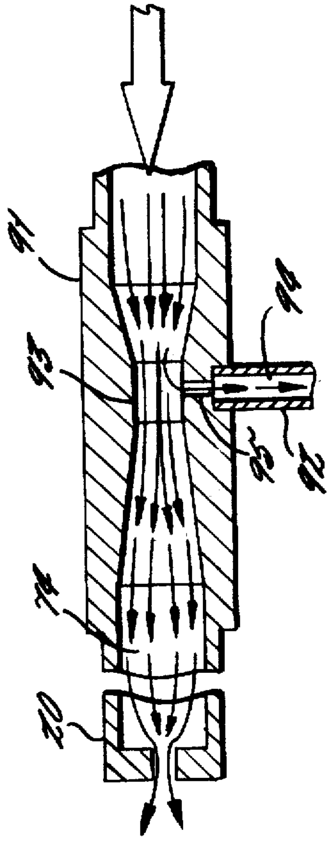
FIG. 5 is a sectional view of the venturi chamber of the plasma arc torch of FIG. 4 when the heat shield is secured on the torch body.

In an alternative embodiment of the torch illustrated in FIGS. 4–6, detecting means 90 is positioned between the source of pressurized gas and conduit 72 of supplying means 70. Detecting means 90 comprises a venturi chamber 91 and a conduit 92 defining a gas passageway 94. Chamber 91 comprises a throat 93 having an opening 95 extending outwardly therefrom and into conduit 92. Passageway 94 extends between opening 95 of chamber 91 and a pressure switch 96 such that the pressure switch is in fluid communication with throat 93.

In operation, pressurized gas flows through passageway 74 in conduit 72 as previously described. If the heat shield 62 is in place, a restricted flow through the body 20 takes place as illustrated schematically in FIG. 5, and a back pressure of pressurized gas will be sensed at pressure switch 96 via passageway 94 and opening 95. Accordingly, pressure switch 96 will be closed and the power source will supply an electrical current to the electrode 40.

If, however, there is insufficient gas pressure in torch body 20, such as when heat shield 62 is removed, and as illustrated schematically in FIG. 6, the pressurized gas will flow freely through torch body 20 to the ambient atmosphere in the manner previously described and illustrated in FIG. 3. As a result, the venturi chamber 91 will suction the gas in passageway 94 into passageway 74 in conduit 72. Accordingly, pressure switch 96 will not sense sufficient back pressure and will be open. Thus, the power source will not supply an electrical current to the electrode 40.

Figure 7:
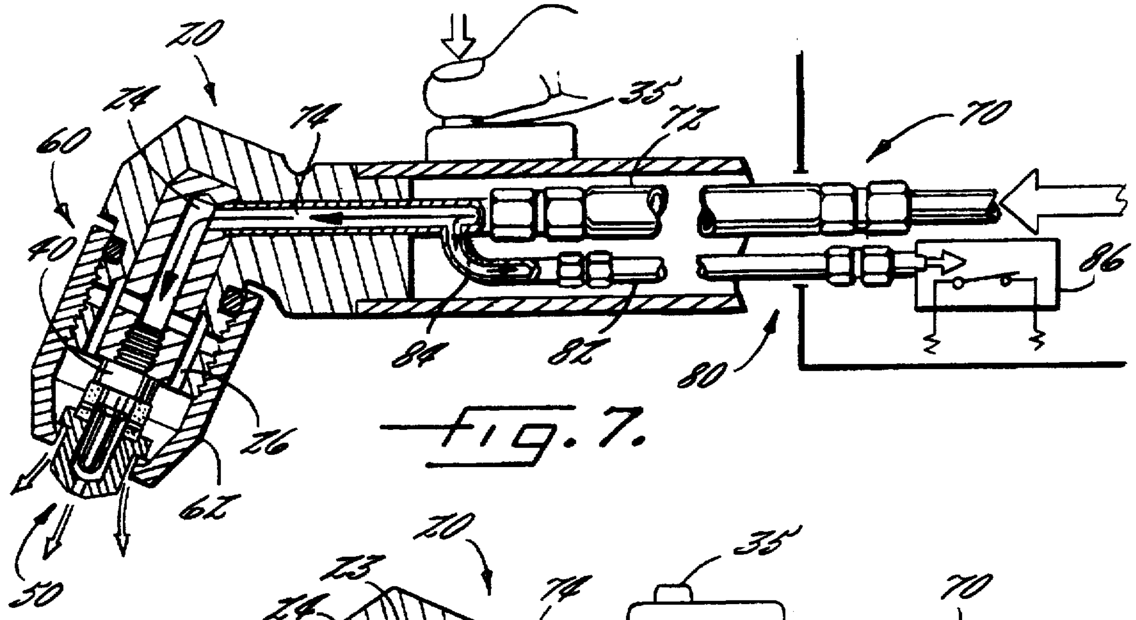
FIG. 7 is a sectional view of an alternative embodiment of a plasma arc torch according to the invention with the heat shield secured on the torch body.

In another alternative embodiment of the torch 10, illustrated in FIG. 7, detecting means 80 is positioned within handle portion 31 adjacent supplying means 70. Thus, gas passageway 84 in conduit 82 is in fluid communication with gas passageway 74 in conduit 72. Accordingly, as long as there is sufficient gas pressure in torch body 20, pressure switch 86 will be closed and the power source will supply an electrical current to the electrode 40. If heat shield 62 is removed, however, pressure switch 86 will be open and an electrical current will not be supplied to electrode 40.

Figure 8:
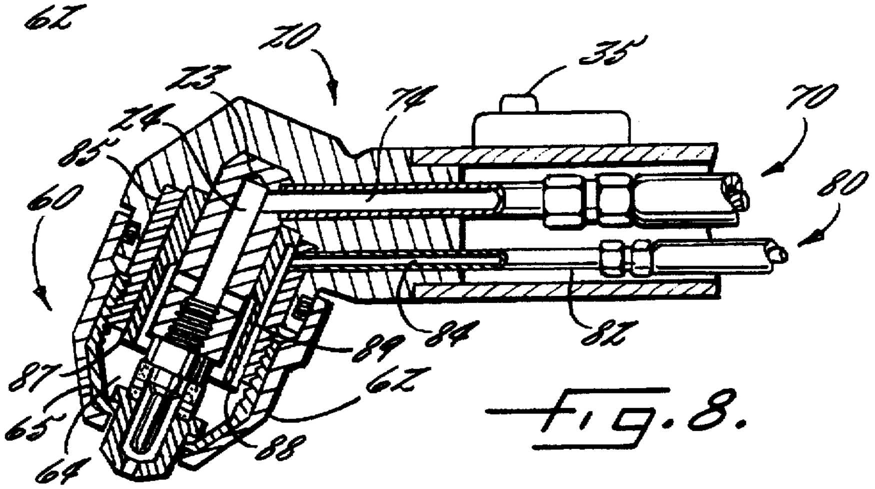
FIG. 8 is a sectional view of an alternative embodiment of a plasma arc torch according to the invention with the heat shield secured on the torch body.

In another alternative embodiment of the torch 10, illustrated in FIG. 8, the torch includes a pilot arc circuit for creating a pilot arc extending outwardly along the discharge axis in the direction of the workpiece. The torch 10 is provided with gas supplying means 70 and detecting means 80 as previously described. The conduit 82 of the detecting means 80, however, is conductive and is in electrical contact with a conducting body 85 secured to the inner surface of housing 22 of torch body 20. A conducting insert 65 secured to the inner surface of the heat shield 62 and in electrical contact with the conducting body 85 completes an electrical circuit between the conductive conduit 82 and the nozzle 52.

An insulating body 87 positioned between the electrode holder 23 and the conducting body 85 has a slot 88 therein defining a gas passageway 89. Thus, the conduit 82 is in fluid communication with the cavity 64 defined by the heat shield 62. Accordingly, if there is sufficient gas pressure in torch body 20, pressure switch 86 will be closed and the power source will supply an electrical current to the electrode 40. If there is insufficient gas pressure, such as when heat shield 62 is removed, pressure switch 86 will be open and an electrical current will not be supplied to the electrode 40.

As illustrated in FIG. 10, a particular feature of the invention prevents the power source from supplying electrical current to the electrode 40 when the heat shield 62 is removed even if the head portion 21 of the torch body 20 is inadvertently held firmly against the workpiece or a flat surface. When the operator depresses the control switch 35, a pressurized flow of gas is supplied to the torch body 20 as previously described. Although the housing 22 of head portion 21 is held firmly against the workpiece or flat surface, a back pressure of pressurized gas will not flow to pressure switch 86 through gas passageway 84. Instead, the pressurized gas will flow out the radially extending opening 28 in housing 22 to the ambient atmosphere. Accordingly, pressure switch 86 will be open and the power source will not be supply an electrical current to the electrode 40.

Figure 9:
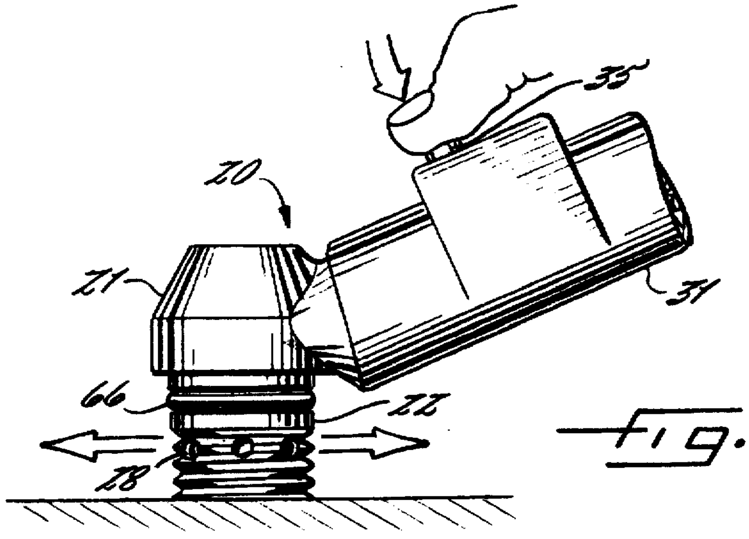
FIG. 9 is a view similar to FIG. 8 but illustrating still another embodiment of the invention.

While the embodiments illustrated above show a plasma arc torch that utilizes a single gas source, the present invention is equally applicable to a plasma arc torch that utilizes more than one gas source. For example, and as illustrated in FIG. 9, the invention may be applied to a plasma arc torch including a first gas source 70 for supplying the plasma gas to the internal bore 24 of the electrode holder and a second gas source, i.e. conduit 82, for supplying a shielding and cooling gas to the slot 89 and thus the cavity 64, under a regulated pressure. In such an embodiment, the torch may include an additional conduit 82*a* which also communicates with the slot 89 for sensing the pressure in the cavity 64 and operating a pressure switch in the manner described above.

From the above disclosure, it will be seen that the present invention is able to safely and reliably disable the power source to prevent the flow of electrical current to the electrode 40 whenever there is insufficient gas pressure in torch body 20, such as when the heat shield 62 is removed. Obviously, many alternative embodiments of the invention are within the ordinary skill of those skilled in the art. Therefore, it is not intended that the invention be limited to the preceding description of illustrative preferred embodiments, but rather that all embodiments within the spirit and scope of the invention disclosed and claimed herein be included.

That which is claimed is:

1. A plasma arc torch comprising torch body including a generally cylindrical head portion which defines a discharge axis, an electrode mounted to said head portion of said torch body and coaxially aligned with the discharge axis, said electrode having an arc discharge end, a nozzle assembly positioned adjacent said electrode so as to define a cavity between said electrode and the nozzle assembly, said nozzle assembly including at least one radial bore and an axial bore which is coaxially aligned with the discharge axis, an outer heat shield removably secured on said torch body so as to surround at least a portion of said electrode and said nozzle assembly, and such that said outer heat shield defines an internal gas passageway which communicates with the radial bore in said nozzle assembly, power supply means connected to said electrode for supplying an electrical current to the electrode to create an electrical arc extending from the electrode and through the axial bore of the nozzle assembly, means for supplying a pressurized flow of gas into said gas passageway so that the gas flows through the one radial bore and into the cavity defined by the nozzle assembly, to thereby create a plasma flow through the axial bore of said nozzle assembly, and means for sensing the gas pressure in the gas passageway and for disabling said power supply means and thereby interrupting the flow of electrical current to said electrode in response to the gas pressure in the gas passageway;

said sensing and disabling means comprising a sensing conduit having one end disposed within the cylindrical head portion of said torch body and extending outwardly from said torch body, and with said one end being in fluid communication with said internal gas passageway, and a pressure switch operatively connected to said sensing conduit at a location outside of said cylindrical head portion and so as to be responsive to the gas pressure in the internal gas passageway.

2. A plasma arc torch according to claim 1 wherein said power supply means is disabled upon said sensing and disabling means sensing a gas pressure in the internal gas passageway which is below a predetermined level.

3. A plasma arc torch according to claim 2 wherein said pressurized gas supplying means comprises at least one gas delivery conduit, and a tubular electrode holder mounted coaxially within said cylindrical head portion and having an internal bore communicating with said gas delivery conduit and with said internal gas passageway.

4. The plasma arc torch according to claim 3 wherein said pressurized gas supplying means further comprises a second gas delivery conduit for supplying gas to the internal gas passageway.

5. The plasma arc torch according to claim 1 further comprising pilot arc circuit means extending from said nozzle means to said power supply means and so as to permit a pilot arc to extend from said electrode to said nozzle means.

6. A plasma arc torch comprising a torch body including a generally cylindrical head portion which defines a central axis and a lower end, and a mounting bore which extends along said central axis and communicates with said lower end, a tubular electrode holder having an internal bore which includes a closed inner end and an open outer end and being positioned coaxially in said mounting bore of said cylindrical head portion of said torch body, said electrode holder having a lower end portion which is radially spaced from said cylindrical head portion of said torch body so as to define an open passage therebetween, and said tubular electrode holder including a radial bore extending between said internal bore and said open passage, an electrode having one end which is mounted to said lower end portion of said electrode holder so as to close said outer end thereof, and an opposite arc discharge end portion, a nozzle assembly positioned so as to surround said arc discharge end portion of said electrode and having a bore therethrough which is coaxially aligned with said arc discharge end portion, an outer heat shield which includes an outlet opening and a lip surrounding said outlet opening, with said outer heat shield being removably mounted on said cylindrical head portion of said torch body so that the nozzle assembly extends through said outlet opening and is engaged by said lip so that the lip supports the nozzle assembly in contact with said electrode, said outer heat shield defining an internal cavity which communicates with said open passage, a first gas passage extending through said nozzle assembly so as to permit gas to flow from said internal cavity into said nozzle assembly and along said arc discharge end portion of said electrode and then outwardly through said bore of said nozzle assembly, a second gas passage extending between said lip of said outer heat shield and said nozzle assembly so as to permit gas to flow from said internal cavity along the outside of said nozzle assembly and outwardly through said outlet opening, power supply means connected to said electrode for supplying an electrical current to the electrode to create an electrical arc extending from the discharge end portion of the electrode and through the bore of the nozzle assembly, means including a gas delivery conduit for supplying a pressurized flow of gas through said torch body and said electrode holder and to said internal bore of said electrode holder, such that the gas flows through said radial bore of said electrode holder to said open passage and into said internal cavity, and from said internal cavity through both of said first and second gas passages, and means for sensing the gas pressure as it flows through the torch and for disabling the power supply means and thereby terminating the flow of electrical current to said electrode in response to the pressure falling below a predetermined level;

said sensing and disabling means comprising a sensing conduit having one end disposed within the cylindrical head portion of said torch body and extending outwardly from said torch body, and with said one end being in fluid communication with said open passage, and a pressure switch operatively connected to said sensing conduit at a location outside of said cylindrical head portion and so as to be responsive to the gas pressure in the internal gas passageway.

7. The plasma arc torch according to claim 6 wherein said lower end portion of said tubular electrode holder includes a lower end which is coextensive with the lower end of said cylindrical head portion of said torch body, and further comprising a radial hole in said cylindrical head portion to permit exhaust of gas upon removal of the outer heat shield and the closure of said open passage.

8. The plasma arc torch according to claim 6 wherein said outer heat shield is threaded upon the cylindrical head portion so as to cover and close the radial hole in said tubular sleeve portion.

9. A plasma arc torch according to claim 6 wherein said one end of said sensing conduit is positioned within said internal bore of said electrode holder.

10. The plasma arc torch according to claim 6 wherein said one end of said sensing conduit communicates with said internal cavity.

11. The plasma arc torch according to claim 10 wherein said pressurized gas supplying means further comprises a second gas delivery conduit for supplying gas to said internal cavity.

12. The plasma arc torch according to claim 6 further comprising pilot arc circuit means extending from said nozzle means to said power supply means and so as to permit a pilot arc to extend from said electrode to said nozzle means.

13. A plasma arc torch comprising a torch body including a generally cylindrical head portion which defines a discharge axis, an electrode mounted to said head portion of said torch body and coaxially aligned with the discharge axis, said electrode having an arc discharge end, a nozzle assembly positioned adjacent said electrode so as to define a cavity between said electrode and the nozzle assembly, said nozzle assembly including at lease one radial bore and an axial bore which is coaxially aligned with the discharge axis, an outer heat shield removably secured on said torch body so as to surround at least a portion of said electrode and said nozzle assembly, and such that said outer heat shield defines an internal gas passageway which communicates with the radial bore in said nozzle assembly, power supply means connected to said electrode for supplying an electrical current to the electrode to create an electrical arc extending from the electrode and through the axial bore of the nozzle assembly, means including a gas delivery conduit for supplying a pressurized flow of gas into said gas passageway so that the gas flows through the radial bore and into the cavity defined by the nozzle assembly, to thereby create a plasma flow through the axial bore of said nozzle assembly, and means for sensing the gas pressure in the gas passageway and for disabling said power supply means and thereby interrupting the flow of electrical current to said electrode in response to the gas pressure in the gas passageway;

said sensing and disabling means comprising a Venturi chamber positioned within said gas delivery conduit and including a passage of reduced diameter, a sensing conduit communicating with said passage of reduced diameter, and a pressure switch communicating with said sensing conduit and so as to be responsive to the gas pressure in the gas passageway.

* * * * *